United States Patent

Kurogane et al.

[11] Patent Number: 5,014,331
[45] Date of Patent: May 7, 1991

[54] METHOD OF DETECTING AN INTERNAL POINT WITHIN A CLOSED AREA

[75] Inventors: Toshio Kurogane; Daiji Nagaoka, both of Kanagawa, Japan

[73] Assignee: Fuji Xerox Co., Ltd., Tokyo, Japan

[21] Appl. No.: 437,183

[22] Filed: Nov. 16, 1989

[30] Foreign Application Priority Data

Nov. 18, 1988 [JP] Japan ............................ 63-150862[U]

[51] Int. Cl.$^5$ .............................................. G06K 9/00
[52] U.S. Cl. ......................................... 382/48; 382/22; 358/453; 358/452; 340/723
[58] Field of Search ................. 382/8, 22, 48; 358/76, 358/452, 453; 364/900, 200; 340/723

[56] References Cited

U.S. PATENT DOCUMENTS 4,570,233 2/1986 Yan et al. .
4,791,676 12/1988 Flickner et al. ...................... 382/26
4,830,497 5/1989 Iwata et al. .............................. 382/8
4,856,074 8/1989 Nagaoka ................................ 382/22
4,866,783 9/1989 Ohyama ................................. 382/23

Primary Examiner—Leo H. Boudreau
Assistant Examiner—Daniel Santos
Attorney, Agent, or Firm—Finnegan, Henderson, Farabow, Garrett and Dunner

[57] ABSTRACT

A method of determining an internal point within a closed area, which includes the steps of drawing a circumference of a closed area on a bit map memory by bits corresponding to a plurality of successive picture elements, and calculating coordinates of an internal point of the closed area on the basis of maximizing and minimizing in the respective axial directions of coordinates of the picture elements constituting the circumference of the closed area. With the invention, a user only need draw an external form of a free form. It is unnecessary to indicate a start point of a painting out operation. Therefore, the operation of setting an area is simplified and erroneous operation is prevented.

6 Claims, 5 Drawing Sheets

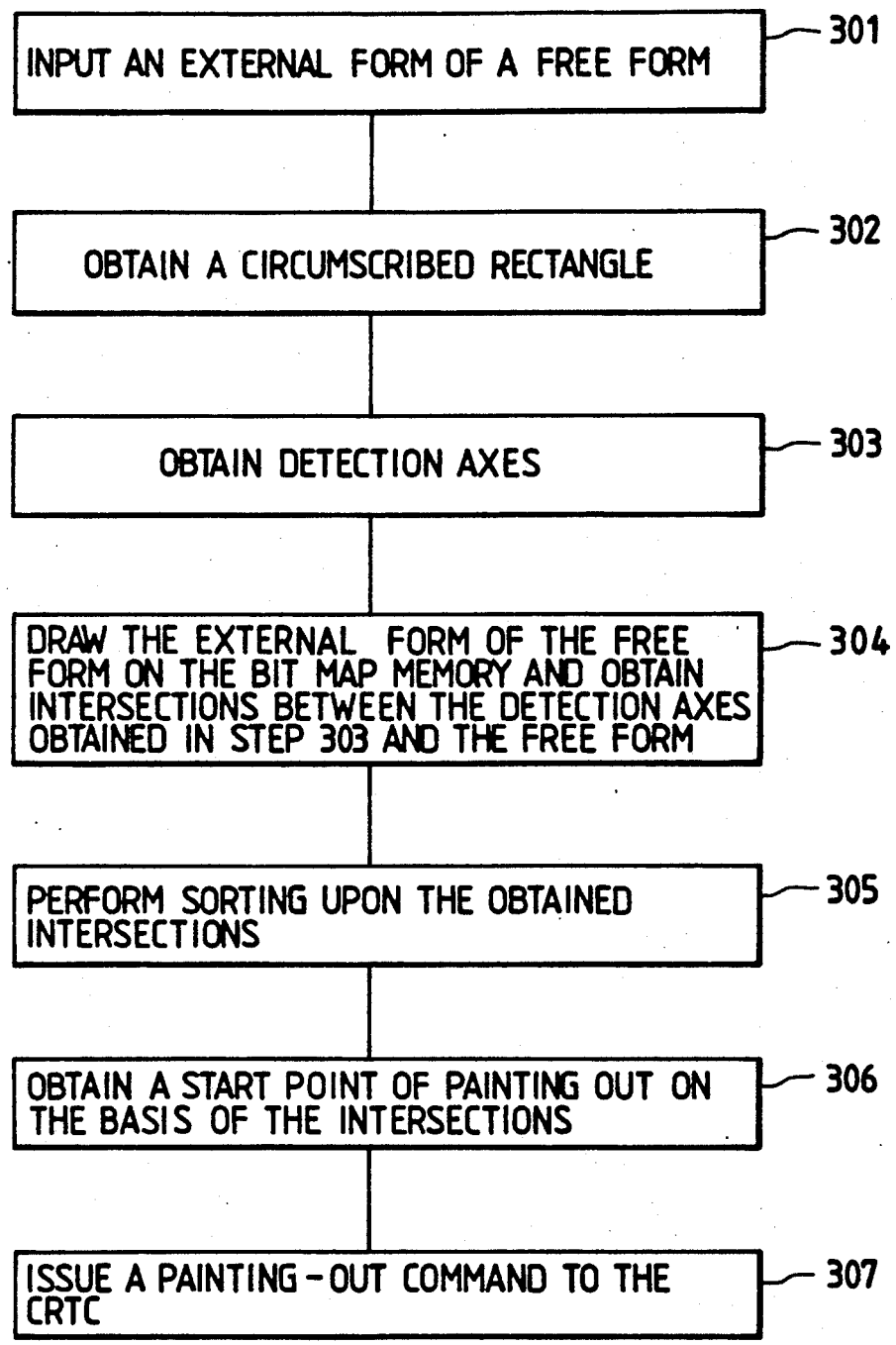

METHOD OF DETECTING AN INTERNAL POINT WITHIN A CLOSED AREA

BACKGROUND OF THE INVENTION

1. Field of the Invention

The present invention relates to an image editing apparatus used in a copying machine or the like, and particularly relates to a method of designating a closed area which is an object to be edited.

2. Description of the Related Art

Recently, a copying machine has been developed that not only copies an image of a subject copy or original as it is, but that also sets an image area of the subject copy or original so as to perform an image processing such as extraction, elimination, etc.

In such a copying machine that can perform image editing, at the time of the above-mentioned image editing, it is necessary to set an area to be edited. At the time of the setting of an area to be edited, a coordinate input apparatus called a digitizer is often used. The digitizer has a dimension corresponding to that of a subject copy or original, and configured so that if a subject copy or original is set on the digitizer and an area to be edited of the subject copy or original is indicated, the coordinate data of the area to be edited are taken into the copying machine. Further, on the basis of the coordinate data, a bit pattern corresponding to the area to be edited is written into a bit map memory. That is, closed-area painting out is performed.

In one conventional method for performing closed area painting out coordinates of a plurality of points are designated and those points are connected successively so as to form an external frame of a closed area, and then an internal point of this closed area is designated by a user so that painting out is started from this point.

As mentioned above, in the conventional method of painting out a closed area, it is necessary for a user to designate a start point of the closed area painting out. During the operation of actually designating the coordinates of a plurality of points forming the closed area through a digitizer, however, the coordinates of the respective points are only stored as data and the actual positions of those points cannot be confirmed directly through eyes. There is therefore a possibility that a point outside the closed area will be designated erroneously when a start point of the closed area painting out is designated. Such a possibility increases particularly in the case of a narrow closed area. It is therefore necessary to perform an area setting operation carefully resulting in lowered operation quality.

Moreover, in the case of setting a polygon having four or more sides or a free form, there is a possibility that the polygon or free form is divided into a plurality of closed areas depending on the way of taking coordinates. In such a case, a start point must be designated for every closed area. This requirement makes the setting operation even more troublesome. Furthermore, the possibility of leaving painting becomes higher.

SUMMARY OF THE INVENTION

It is therefore an object of the present invention to solve the foregoing problems.

It is another object of the present invention to provide a method of automatically detecting an internal point to be used as a starting point of painting out within a closed area.

In order to attain the foregoing objects, according to an aspect of the present invention, the method of detecting an internal point within a closed area, comprises the steps of: drawing a circumference of a closed area on a bit map memory by bits corresponding to a plurality of successive image elements; and calculating coordinates of an internal point of the closed area on the basis of maximizing and minimizing in the respective axial directions of coordinates of the image elements constituting the circumference of the closed area.

Preferably, the internal point within the closed area is obtained through the steps of: obtaining a rectangle circumscribed on the closed area; setting one or more axes extending parallelly to each side of the circumscribed rectangle; and calculating the internal point within the closed area on the basis of coordinates and conditions of intersections between the axes and the circumference of the closed area.

BRIEF DESCRIPTION OF THE DRAWINGS

Other features and advantages of the present invention will be apparent from the following description taken in connection with the accompanying drawings, wherein:

FIG. 4 is a flowchart for explaining the processing method of painting out a free form;

DETAILED DESCRIPTION OF THE INVENTION

First, the principle of the method of detecting an internal point of a closed area according to the present invention will be described by way of a simple example with reference to FIGS. 1(a) through 1(f).

Figure 1A:
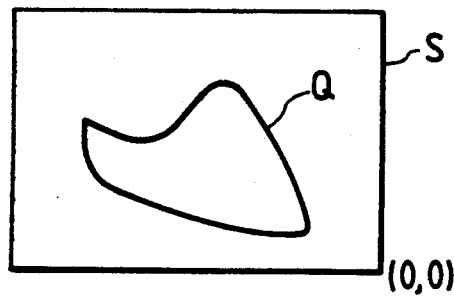
FIGS. 1(a) through 1(f) are diagrams for explaining the principle of the method of detecting an internal point within a closed area according to the present invention.
Figure 1B:
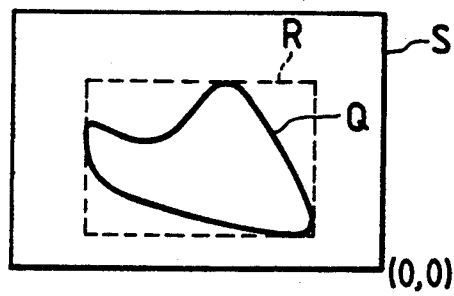
Figure 1C:
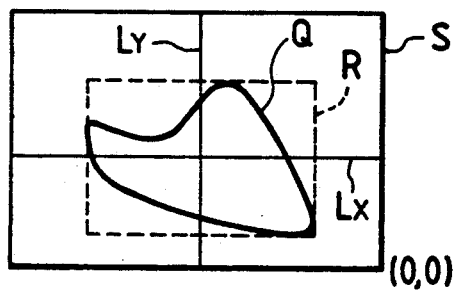
Figure 1D:
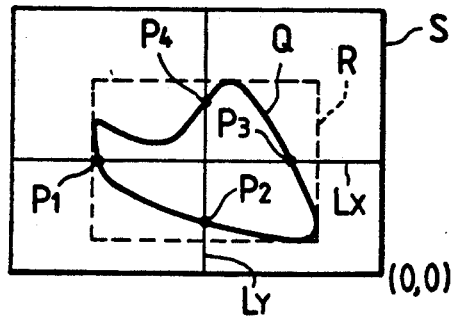
Figure 1E:
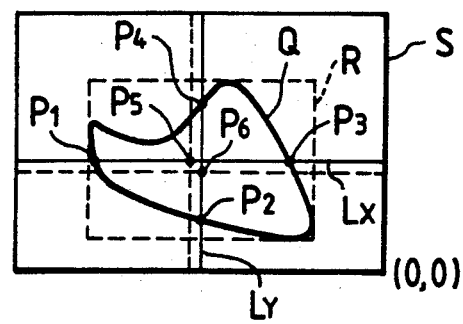
Figure 1F:
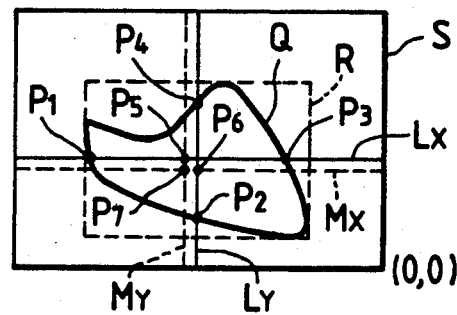

According to the present invention, first, as shown in FIG. 1(a), an external form of a free form Q is input within a drawing area S. Next, as shown in FIG. 1(b), a rectangle R circumscribing the external form of the free form Q is obtained. Next, as shown in FIG. 1(c), Y and X axes $L_Y$ and $L_X$, respectively, passing middle points of the rectangle R in the X and Y axial directions are obtained. These axes $L_Y$ and $L_X$ are used as axes for detecting an internal point. Then, it is assumed that the circumscribed rectangle R is included within the drawing area S. Next, as shown in FIG. 1(d), intersections $P_1$ to $P_4$ between the axes $L_Y$ and $L_X$ and the external form of the free form Q are obtained. Next, the intersections are classified for every axis. That is, the intersections $P_1$ and $P_3$ are set in one group, and the intersections $P_2$ and $P_4$ are in the other group. Next, in each group, the intersections are arranged in the order of increasing coordinate value. That is, as for the X axis, the intersections are arranged in the order of $P_3$ and $P_1$, and for the Y axis, in the order of $P_2$ and $P_4$. Next, the intersections are numbered along each axis, and it is determined that a portion from an even number through an odd number is outside the free form Q, and a portion from an odd number through an even number is inside the free form Q. That is, because the intersections $P_3$ and $P_1$ are the first and the second ones respectively, the portion from the intersection $P_3$ till the intersection $P_1$ is inside the free form Q, and the other portion is outside. As for the Y axis, the portion from the intersection $P_2$ till the intersection $P_4$ is inside the free form Q, and the other portion is outside. Next, as shown in FIG. 1(e), a middle point $P_5$ between the intersections $P_3$ and $P_1$ is obtained, and at the same time a middle point $P_6$ between the intersections $P_2$ and $P_4$ is obtained. Last, as shown in FIG. 1(f), an intersection $P_7$ between $M_X$ and $M_Y$ axes in the X and Y directions respectively passing the middle points $P_6$ and $P_5$ is obtained as an internal point.

That is, by the above-mentioned processing, an internal point within the free form Q, that is, a closed area, is obtained automatically.

Now, a preferred embodiment of the present invention will be described with reference to the drawings.

Figure 2:
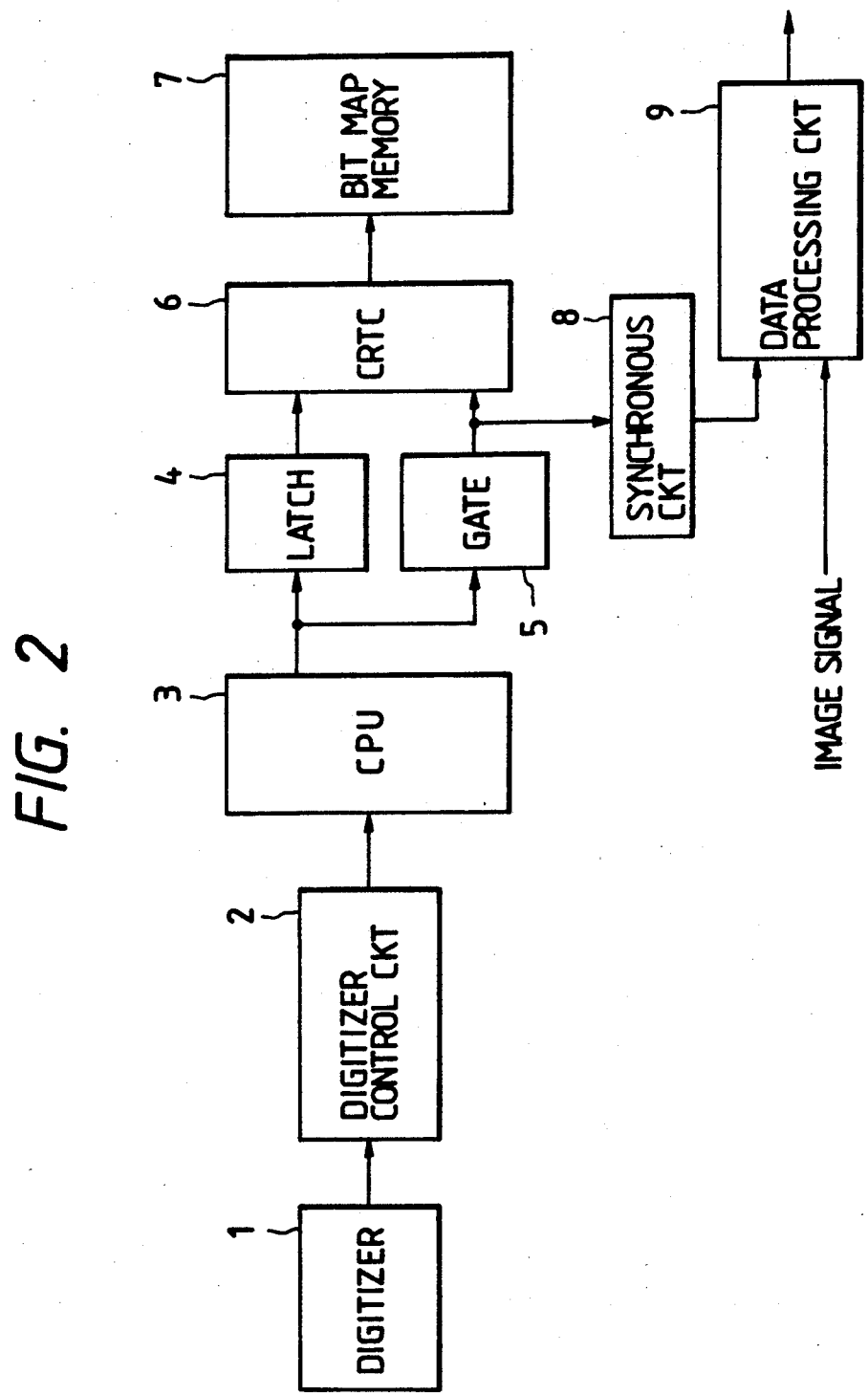
FIG. 2 is a block diagram illustrating an edited area designating apparatus to which a method of detecting an internal point according to the present invention is applied.

FIG. 2 is a block diagram illustrating an edited area designating apparatus to which the method of detecting an internal point according to the present invention is applied.

A digitizer 1 for inputting coordinates for designating an edited area is connected to a CPU 3 through a digitizer control circuit 2. The CPU 3 is connected to a CRTC (cathode ray tube control circuit) 6 through a latch 4 and a gate 5, and a bit map memory 7 is also connected to the CRTC 6. The CRTC 6 serves to paint out a closed area in the bit map memory 7 at a high speed on the basis of coordinate data and a drawing command from the CPU 3. In the "painting out a closed area operation," for example, "1" is set to each of bits of the bit map memory 7 corresponding to an area defined by a plurality of sets of designated coordinates.

At the time of editing an image, the contents of the bit map memory 7 is read out by the CRTC 6 and supplied to a data processing circuit 9 by a synchronous circuit 8 in synchronism with a clock of an image signal. The image signal, which will be a subject of editing, is supplied to the data processing circuit 9 in which predetermined image edition is performed corresponding to the contents of the bit map memory 7. For example, when elimination editing is to be performed an image of an area corresponding to the area constituted by the bits which have been set to "1" in the bit map memory 7 is eliminated from the image signal.

Next, a method of designating a closed area in the above-mentioned edited area designating apparatus will be described.

The following is a description of a method of setting an area by use of a free form, in which the form of a closed area is not in problem.

Figure 3:
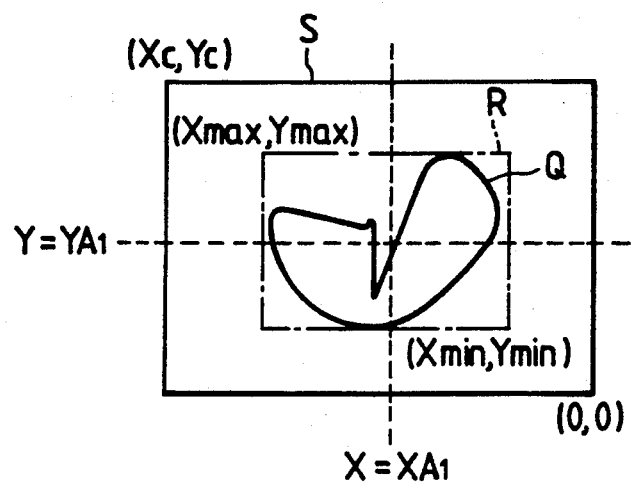
FIG. 3 is an explanatory diagram illustrating the detection axes in the case where a free form is inside a drawing area.

In the case where the external form of an area to be edited is a free form Q as shown in FIG. 3, the free form Q is traced by pressing an indicating pen (not-shown) to a coordinate input face of the digitizer 1. Then, whenever the inputted coordinates are changed by a constant value, the coordinates are automatically inputted sequentially as new coordinates.

When the external form of the free form Q has been inputted by the above-mentioned operation, the frame of a figure is determined, but it is not yet determined which side of this frame should be painted out. It is therefore necessary to detect a start point of painting out. A method of this detection will be described with reference to a flowchart in FIG. 4.

First, in a Step 301, the external form of the free form Q is inputted in a manner described above.

Next, in a Step 302, a rectangle R circumscribing this external form is obtained (with reference to FIG. 3).

Next, in a Step 303, detection axes for detecting a start point of painting out are obtained.

The number of the detection axes is set to a value within a range of from two to six according to the relationship between the circumscribed rectangle R of the free form Q and a drawing area S.

Assuming that the maximum and minimum coordinate values of the circumscribed rectangle in the X and Y directions are $X_{max}$, $X_{min}$, $Y_{max}$ and $Y_{min}$ respectively and that the drawing area is within a range of from (0,0) to $(X_c, Y_c)$, the axes X and Y are expressed by:

$$X = \{min(X_{max}, X_c) - max(0, X_{min})\}/2$$

$$Y = \{min(Y_{max}, Y_c) - max(0, Y_{min})\}/2$$

Further, axes X and Y as expressed by the following equations are also effective in the case that the following conditions are satisfied, respectively:

If $X_{max} > X_c$, $X = X_c - 1$ if $Y_{max} > Y_c$, $Y = Y_c - 1$ if $X_{min} < 0$, $X = 1$, and if $Y_{min} < 0$, $Y = 1$.

Figure 5:
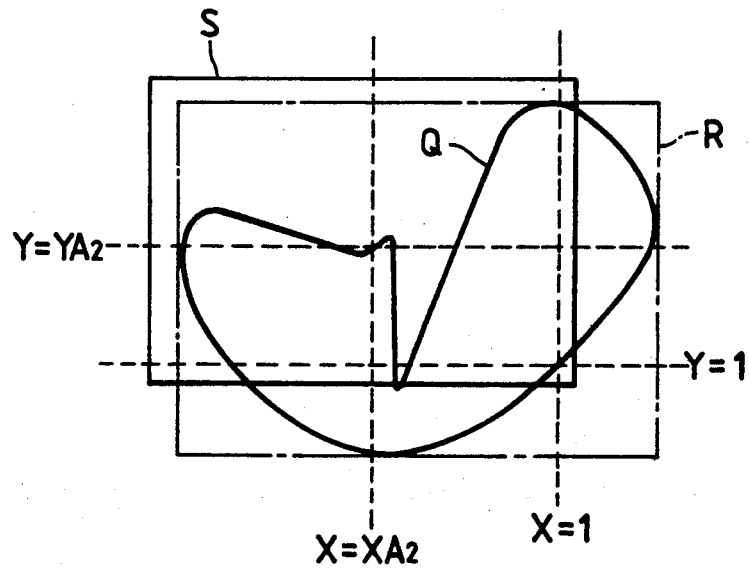
FIG. 5 is an explanatory diagram illustrating the detection axes in the case where a part of a free form is outside a drawing area.

FIG. 3 shows the case where the circumscribed rectangle R is inside the drawing area S, and then two detection axes are determined, that is, $X = XA_1$ and $Y = YA_1$. On the other hand, FIG. 5 shows a case where the minimums of the coordinates in the X and Y directions of the circumscribed rectangle R are in the negative side to the origin (0,0), while the maximums of the same are inside the drawing area S. In this case of FIG. 5, the axes become four, that is, $X = XA_2$, $Y = YA_2$, $X = 1$ and $Y = 1$. Further, in the case where both of the maximums and minimums of the coordinates in the X and Y directions of the circumscribed rectangle R, two axes, that is, $X = X_c - 1$ and $Y = Y_c - 1$ are added so that the sum of axes becomes six.

Then, in a Step 304, the external form of the free form Q is drawn on the bit map memory 7 (with reference to FIG. 2), and at the same time, intersections between the axes obtained in the Step 303 and the free form Q are obtained.

The intersection of each side of the free form Q to a certain axis can occur in four ways, as shown in FIGS. 6(a) through 6(d).

Assume that the axis is expressed by $X = Const$ (where Const represents a constant value). Then, a flag f representing the point $(C_X, C_Y)$ and condition of each intersection to the axis with respect to the vertexes $(X_o, Y_o)$ through $(X_n, Y_n)$ of the free form Q is defined as follows. Here, let the gradient and Y-intercept of a straight line passing through the points of $(X_i, Y_i)$ and $(X_{i+1}, Y_{i+1})$ be A and B respectively. Then, the flag f becomes "1" when the obtained start point of painting out is on a boundary line, and in this case, the processing of painting out is not to be performed.

Figure 6:
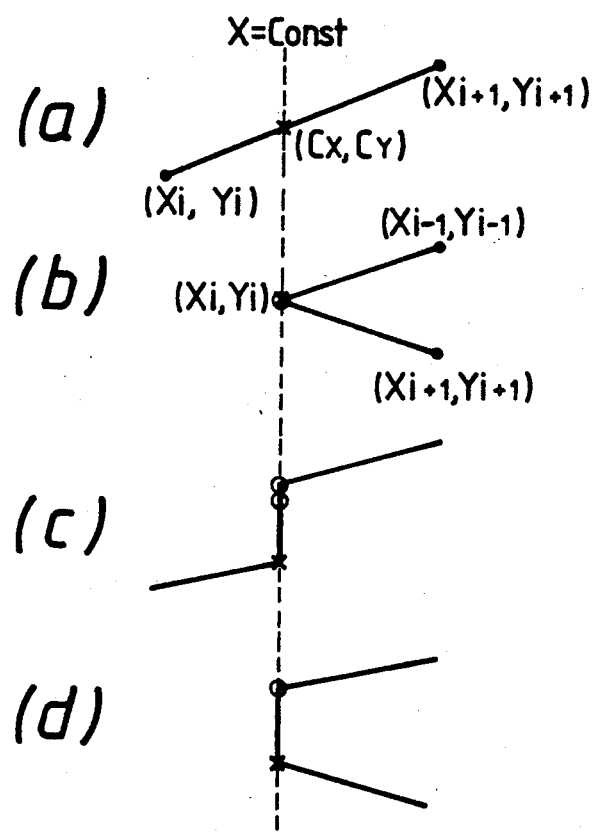
FIG. 6 is a diagram for explaining the condition of intersections between a free form and axes for detecting a start point of painting out.

In the case of FIG. 6(a),
when $$(X_i < \text{Const}) \& (X_{i+1} > \text{Const}),$$

$$\text{OR}(X_i > \text{Const}) \& (X_{i+1} < \text{Const})$$

$$= 1$$

then $$C_X = \text{Const}$$

$$C_Y = A \times \text{Const} + B$$

$$f = 0$$

where the mark "&" represents logical product or ANDing, and "OR" represents logical sum or ORing.

In FIG. 6(a), the sign "x" at the intersection means that the flag f is "0". In FIGS. 6(b) et seq., the sign "o" at the intersection means that the flag f is "1".

In the case of FIG. 6(b),
when $$(X_{i-1} > \text{Const}) \& (X_i = \text{Const}) \& (X_{i+1} > \text{Const})$$

$$\text{OR}(X_{i-1} < \text{Const}) \& (X_i = \text{Const}) \& (X_{i+1} \text{Const})$$

$$= 1$$

then $$C_X = \text{Const}$$

$$C_Y = Y_i$$

$$f = 1$$

and $$C_X' = \text{Const}$$

$$C_Y' = Y_i$$

$$f' = 0$$

That is, in the case where the free form Q is turned up on the axis, it is regarded that the free form Q intersects the axis twice and two intersections are defined.

In the case of FIG. 6(c),
when $$(X_{i-1} > \text{Const}) \& (X_i \text{18}$$
$$X_{i+m} = \text{Const}) \& (X_{i+m+1} < \text{Const})$$

$$R(X_{i-1} < \text{Const}) \& (X_i \sim X_{i+m} = \text{Const}) \& (X_{i+m+1} > \text{Const})$$

$$= 1$$

then $$C_X = \text{Const}$$

$$C_Y = \min(Y_i, Y_{i+m+1})$$

$$f = 1$$

and $$C_X' = \text{Const}$$

$$C_Y' = \min(Y_i, Y_{i+m+1})$$

$$f' = 1$$

and $$C_X'' = \text{Const}$$

$$C_Y'' = \max(Y_i, Y_{i+m+1})$$

$$f'' = 0$$

In the case of FIG. 6(d),
when $$(X_{i-1} > \text{Const}) \& (X_i \sim X_{i+m} = \text{Const}) \& (X_{i+m+1} > \text{Const})$$

$$\text{OR}(X_{i-1} < \text{Const}) \& (X_i \sim X_{i+m} = \text{Const}) \& (X_{i+m+1} < \text{Const})$$

$$= 1$$

then $$C_X = \text{Const}$$

$$C_Y = \min(Y_i, Y_{i+m+1})$$

$$f = 1$$

and $$C_X' = \text{Const}$$

$$C_Y' = \max(Y_i, Y_{i+m+1})$$

$$f' = 0$$

In a Step 305, sorting is performed upon the intersections and flags obtained in the Step 304 so as to arrange the intersections in the ascending order of powers.

In a Step 306, a start point of painting out is obtained on the basis of the sorted intersections.

First, a start point of inside painting out will be described.

Assume that intersections and flags with respect to an axis $X = X_1$ are $(X_1, Y_1)$ through $(X_1, Y_{2n})$ and $f_1$ through $f_{2n}$ respectively. Then, a Y coordinate $P_Y$ of a start point of painting out is obtained as follows. Here, it is assumed that a drawing area is from (0,0) to $(X_c, Y_c)$. If $f_{2k-1} = 0$ (k=1 to n), when $(Y_{2k-1} \leq 0) \& (0 < Y_{2k} \leq Y_c) = 1$, $$P_Y = 1;$$

when $(Y_{2k-1} \leq 0) \& (Y_c \leq Y_{2k}) = 1$, $$P_Y = 1;$$

when $0 \leq Y_{k-1} \leq Y_{2k} \leq Y_c$, $$P_Y = (Y_{k-1} + Y_k)/2; \text{ and}$$

when $(0 \leq Y_{k-1} \leq Y_c) \& (Y_c < Y_k)$, $$P_Y = Y_c - 1.$$

Next, an outside start point of painting out will be described.

Assume that intersections and flags with respect to an axis $X=X_1$ are $(X_1,Y_1)$ through $(X_1,Y_{2n})$ and $f_1$ through $f_{2n}$ respectively. Then, a Y coordinate $P_Y$ of a start point of painting out is obtained as follows. Here, it is assumed that a drawing area is from $(0,0)$ to $(X_{const}, Y_{const})$.

Hereinafter, consideration will be made on three cases as to the axes, $X_1$, $X_2$ through $X_{2n-1}$, and $X_{2n}$.

(I) As for $X_1$:

if $0 < X_1 < X_{const}$ ($X_1$ being inside the drawing area),
$P_Y = 1$ (II) As for $X_2$ through $X_{2n-1}$:

if $f_{2k}=0$ ($k=1$ to $n-1$), and when $(Y_{2k} \leq 0) \& (0 < Y_{2k+1} \leq Y_{const}) = 1$, $P_Y = 1$;
when $(Y_{2k} \leq 0) \& (Y_{const} \leq Y_{2k+1}) = 1$, $P_Y = 1$;

when $0 \leq Y_k \leq Y_{k+1} \leq Y_{const}$, $P_Y = (Y_k + Y_{k+1})/2$;

when $(0 \leq Y_k \leq Y_{const}) \& (Y_{const} < Y_{k+1}) = 1$, $P_Y = Y_{const} - 1$.

(III) As for $X_{2n}$:

when $0 < X_{2n} < X_{const}$ ($X_1$ being inside the drawing area), $P_Y = Y_{const} - 1$ The reason why inside and outside start points of painting out are be obtained separately in the manners as described above is that which one of the inside and outside of the area is to be processed is determined depending on the editing function to be performed. For example, in the case of processing of extraction or the like, it is necessary to paint out only the outside of the area.

Figure 7:
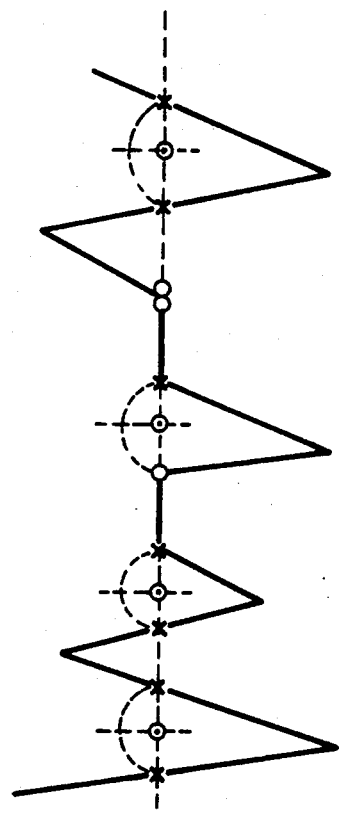
FIG. 7 is a diagram for explaining the procedure of obtaining a start point of painting out.

An example of such start points of painting out obtained in the above manners are illustrated by the sign ● in FIG. 7. Further, the sign x means that the flag f is "0", and the sign o means that the flag f is "1".

Although the procedure of obtaining a Y coordinate $P_Y$ of a start point of painting out has been described in the above description, an X coordinate $P_X$ thereof can be obtained in the same manner.

By the above-mentioned processing, an inside start point of painting out is obtained.

In a Step 307, a painting-out command is issued to the CRTC 6 (with reference to FIG. 2).

By the above-mentioned processing, the inside of the free form Q is painted out.

Further, a free form as divided into a plurality of regions can be painted out certainly by increasing the number of detection axes.

As has been described above, according to the present invention, it is necessary for a user only to draw the external form of a free form, and it is not necessary to indicate a start point of painting out. Therefore, the operation of setting an area is simplified so that it is possible to prevent erroneous operation. Moreover, since a plurality of internal points are detected, even if sides of a free form intersect with each other so that the free form is divided into a plurality of areas, it is possible to paint out all the areas correctly.

What is claimed is:

1. A method of determining an internal point within a closed area, the method performed by a data processing system including a bit map memory and comprising the steps of:
    inputting a circumference of the closed area into the bit map memory as circumference bits corresponding to a plurality of successive picture elements; and
    calculating coordinates of a bit in said bit map memory that corresponds to an internal point of said closed area on the basis of maximizing and minimizing in the horizontal and vertical axial directions of coordinates of the circumference bits, the calculating step further including the steps of:
        determining a rectangle in the bit map memory that circumscribes said closed area;
        setting one or more axes in the bit map memory extending parallel to each side of said rectangle; and
        calculating the coordinates of the bit corresponding to the internal point within said closed area on a basis of coordinates and conditions of intersections between said axes and said circumference of said closed area.

2. A method of determining an internal point within a closed area according to claim 1, the calculating step further including the steps of:
    determining a rectangle in the bit map memory that circumscribes said closed area;
    setting one or more axes in the bit map memory extending parallel to each side of said rectangle; and
    calculating the coordinates of the bit corresponding to the internal point within said closed area on a basis of coordinates and conditions of intersections between said axes and said circumference of said closed area.

3. An apparatus for determining an internal point within a closed area, the apparatus comprising:
    a bit map memory;
    means for inputting a circumference of the closed area into the bit map memory as circumference bits corresponding to a plurality of successive picture elements; and
    means for calculating coordinates of a bit corresponding to an internal point of said closed area on the basis of maximizing and minimizing in the horizontal and vertical axial directions coordinates of the circumference bits, said calculating means including:
        means for determining a rectangle in said bit map memory that circumscribes said circumference bits,
        means for determining horizontal and vertical axes in the bit map memory that extend parallel to each side of said rectangle, and
        means for calculating coordinates of a bit corresponding to the internal point on a basis of coordinates and conditions of intersections between said horizontal and vertical axes and said circumference bits.

4. The apparatus of claim 3, further including means for performing a "painting out" operation on bits in the bit map memory, using the calculated coordinates of the bit as a starting point for the "painting out" operation.

5. A method for determining an internal point within a closed area, the method performed by a data processor having a bit map memory and comprising the steps of:

inputting circumference bits corresponding to a circumference of the closed area into the bit map memory;

determining bits in the bit map memory defining a rectangle that circumscribes said circumference bits;

determining a horizontal axis and a vertical axis in the bit map memory that extend parallel to respective sides of the rectangle; and calculating coordinates of a bit corresponding to the internal point on a basis of coordinates and conditions of intersections between said axes and said circumference bits.

6. The method of claim 5, further including the step, performed by the data processor, of performing a "painting out" operation on bits in the bit map memory, using the calculated coordinates of the bit as a starting point for the "painting out" operation.

* * * * *